United States Patent [19]

Mikelsaar

[11] Patent Number: 4,702,702
[45] Date of Patent: Oct. 27, 1987

[54] THREE-DIMENSIONAL MODEL OF MOLECULAR STRUCTURE AND A DEVICE FOR DISASSEMBLY AND REASSEMBLY OF SAME

[76] Inventor: Raik-Khiio N. Mikelsaar, ulitsa Yakobsona, 11, kv. 4, Tartu, U.S.S.R.

[21] Appl. No.: 847,435

[22] Filed: Jun. 4, 1986

Related U.S. Application Data

[63] Continuation of Ser. No. 625,827, Jul. 25, 1984, abandoned.

[30] Foreign Application Priority Data

Dec. 24, 1982 [WO] PCT Int'l
Appl. .................. PCT/SU82/00035

[51] Int. Cl.$^4$ ............................................. G09B 23/26
[52] U.S. Cl. ........................................ 434/278; 81/418; 446/86; 446/122
[58] Field of Search ................. 434/278, 277; 446/86, 446/122, 123

[56] References Cited

U.S. PATENT DOCUMENTS

| | | | |
|---|---|---|---|
| 2,308,402 | 1/1943 | Taylor | 434/278 |
| 2,882,617 | 4/1959 | Godfrey | 434/278 |
| 3,170,246 | 2/1965 | Koltun | 434/278 |
| 3,251,260 | 5/1966 | Serdechny | |
| 3,452,452 | 7/1969 | Dore | 434/278 |
| 4,622,014 | 11/1986 | Mikelsaar | 434/278 |

FOREIGN PATENT DOCUMENTS 582559  8/1933  Fed. Rep. of Germany .

OTHER PUBLICATIONS

BRD Catalog, "White Instruments", 1958, 4 pages.

*Primary Examiner*—William H. Grieb
*Attorney, Agent, or Firm*—Lilling and Greenspan

[57] ABSTRACT

A three-dimensional model of molecular structure comprises plastic modules and their connecting elements which are made as cylindrical rods whose entire surface, as well as the mating surface of sockets of the modules, is provided with easily curved projections alternating with depressions of the same shape. To assemble or disassemble said three-dimensional model use is made of a device, whose jaws each have a wider portion to hold the module and are bent, and the inner surface of the jaws being provided with wedge-like projections to facilitate disassembly of the modules.

3 Claims, 10 Drawing Figures

THREE-DIMENSIONAL MODEL OF MOLECULAR STRUCTURE AND A DEVICE FOR DISASSEMBLY AND REASSEMBLY OF SAME

This is a continuation of application Ser. No. 625,827 filed on July 25, 1984, now abandoned.

FIELD OF THE INVENTION

This invention relates generally to visual study aids and more particularly to three-dimensional models of molecular structure and to devices for disassembly and reassembly of such models.

BACKGROUND OF THE INVENTION

Three-dimensional models of molecular structure are in effect a number of interconnected modules made of, e.g., plastics. Such modules can be shaped as hemispheres, ellipsoids, hemispheres with cut-off surfaces, or polyhedra. Each module simulates an atom, its radius corresponding to the van der Waals' atomic radius, while the distance from the center of the module to its cut-off surface corresponds to the covalent atomic radius. The elements linking the modules together simulate interatomic bonds, while the angles included between the geometric axes of the linking elements represent the valence angles. Swivel of some individual modules or complexes thereof simulate conforming spatial displacement of atoms.

Some prior-art three-dimensional models of molecular structures are known to comprise modules made as solid spherical elements. The modules are interlinked through connecting elements which are in fact split metallic sleeves having a narrow central portion and adapted to fit into the plain-walled module sockets (cf., e.g., a set 'Eugon' developed at the organic and plastics industry research institute in the city of Budapest, Hungarian People's Republic).

However, it is due to the plain surface of the connecting elements that the sleeves are liable to gradually come out of engagement with the module sockets as the module rotates, thus disturbing the integrity of the three-dimensional model and accuracy of molecular structure simulation. It is also inconvenient that a special device, viz., pliers, should be used to join the modules. In addition the narrower portion of the sleeves is liable to break rather frequently. All this limits applications of modules of the afore-mentioned type to simulation of but relatively small molecular structures.

Another prior-art three-dimensional model of molecular structures comprises plastic modules, each of which representing one atom of the molecular structure being simulated. The modules are shaped as a sphere, hemisphere, ellipsoid, or polyhedron, wherein some portions of their surface can be cut off. The modules are hollow, and their walls are perforated, the perforations being situated at the center of intersecting planes. Each perforation is tapered and has an angle of taper of 4°, its narrower portion facing the center of the element and being surrounded by a stepped projection that restricts the entrance into the module interior.

The modules are interlinked through connecting elements shaped as two cone frustums joined together with their greater bases. The outer surface of these cone frustums are provided with recesses or grooves which engage stepped ridges or projections in the perforations of the modules when the latter are joined together (cf., e.g., U.S. Pat. No. 3,170,246 (1965).

A disadvantage of such three-dimensional models is in their sophisticated construction accounted for by intricate configuration of the connecting elements and perforations in the modules. The aforementioned type of interlinking the modules in practicable with small-sized modules only, which would be more convenient to produce by once-through casting from technological viewpoint. Moreover, the interlinking of modules in such a three-dimensional model is too flexible so that, when simulating large molecules, it is impossible to distinguish between changes developed by the models due to true conforming displacement and those caused by imperfection of construction.

The heretofore known three-dimensional models of molecular structures are assembled by fitting the connecting elements in the sockets or perforations of the modules, making good use of special devices. For instance, use is made of a tool to expand the perforations in the module, which is in effect a cant scraper having a handle and a tip that, when rotated in the peforation, removes a layer of the material with its cutting lips. However, such an operation leaves burrs on the hole edges which deteriorate both the module itself and the connecting elements.

There is also known a device for disengaging the modules from the three-dimensional molecular model, which is essentially a thin metallic plate with a semi-round recess at one of its ends. To disjoin the modules the recessed end of the plate is put in between the modules and the plate is pressed upon through a handle.

However, when pressure is exerted upon the tool and the latter works as a lever, an asymmetric moment of force arises, which affects adversely the model as a whole. Moreover, the device cannot be applied for assembling the model (cf., e.g., an advertising prospectus "Precision Molecular Models", The Bailing Corporation, South Natick, Mass., 1980, 67–7120, p. 3, 17).

SUMMARY OF THE INVENTION

The principal object of this invention is the provision of a three-dimensional model of molecular structure and a device for disassembly and reassembly of such a model, which model and device would be of simple construction and capable of reliable simulation of conforming displacement of the atoms thereof, especially when simulating macromolecules featuring variable interatomic distances.

The aforesaid object is accomplished by a three-dimensional model of molecular structure, comprising plastic modules, each representing one atom of the molecular structure being simulated, which modules are interlinked through connecting elements fitted in the sockets of each module, said sockets bieng so shaped as to suit the shape of a connecting element. According to the invention, each of the connecting elements is made as a cylindrical rod whose entire surface, as well as the mating surface of the socket of each module, is provided with easily curved projections alternating with depressions of the same shape so as to establish a ridge-and-recess joint when the connecting element is fitted in the module socket.

It is expedient that the ridges and recesses be so arranged on the cylindrical rod that their axis should be parallel to the axis of the cylindrical rod, and the entrance to each socket be tapered.

The object of the invention is also accomplished by a device for disassembling and reassembling the three-dimensional model of molecular structure, comprising hinge-joined handles whose ends carry jaws to grip the module when installing it in the three-dimensional model of molecular structure. According to the invention, each of said jaws has a wider portion hold the module to hold in place and is bent, while the inner surface thereof has wedge-shaped projections to facilitate disassembly.

BRIEF DESCRIPTION OF THE DRAWINGS

In what follows the invention is illustrated by a detailed description of specific exemplary embodiments to be had with reference to the accompanying drawings, wherein.

DETAILED DESCRIPTION OF THE INVENTION

Figure 1:
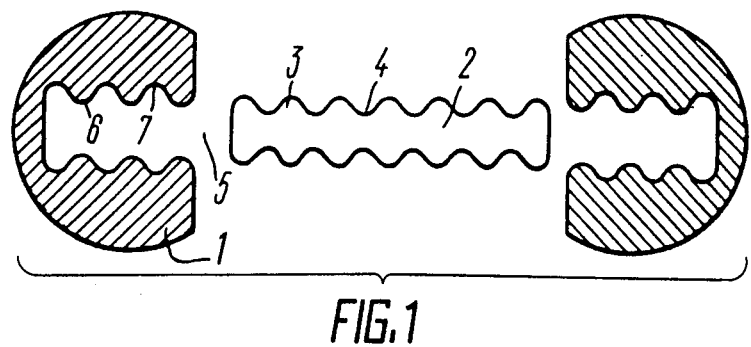
FIG. 1 is a fragmentary view of a disassembled three-dimensional model of molecular structure, according to the invention.

The three-dimensional model of a molecular structure comprises interlinked plastic modules 1 (FIGS. 1, 2, 3), each of said modules repreesnting one atom of the molecular structure being simulated. The modules are shaped as hemispheres 1' (FIG.3), polyhedra 1", or ellipsoids; the surface of every module can be cut off partially. The radius of a module corresponds to the van der Waals' atomic radius, while the distance from the center of the module to the cut-off surface thereof corresponds to the covalent atomic radius.

The modules 1, 1', 1" are linked together through connecting elements, which are in fact cylindrical rods 2 whose entire surface is provided with easily curved projections 3 preferably having a rounded off shape and alternating with depressions 4 of the same shape. As a result the rod surface acquires the shape which may be termed as wave-like.

Each module 1 has mounting holes made as sockets 5 whose face has projections 6 and depressions 7, the same as those on the surface of the connecting elements.

The axis of both the projections 3 and the depressions is strictly parallel to the longitudinal axis of the rods 2.

Figure 2B:
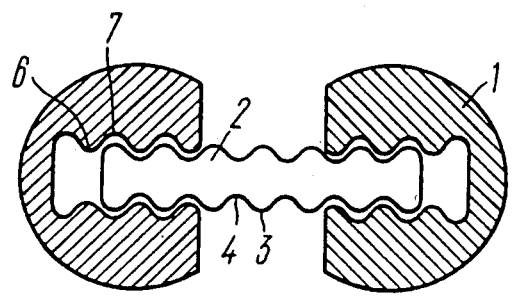
FIGS. 2a and 2b show the three dimensional module when assembled.
Figure 2A:
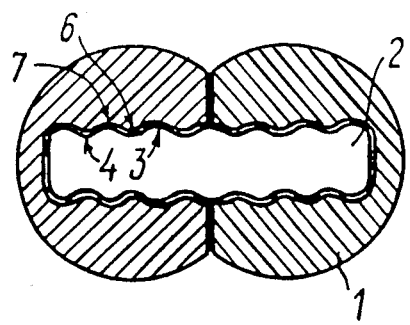
Figure 3:
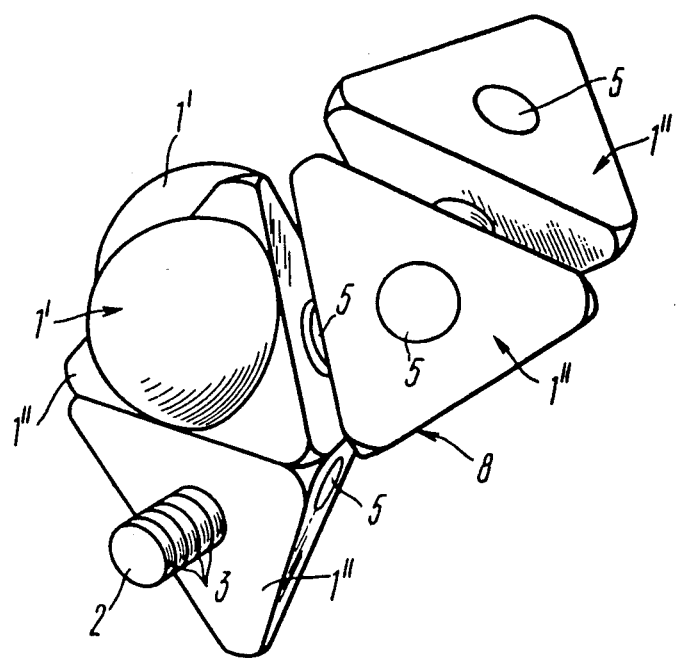
FIG. 3 is a fragmentary view of a model of macromolecule.

When assembling the three-dimensional molecular model, the modules 1 are linked together by the rods 2 in a required order. To this end the rods 2 are fitted into the sockets 5 applying a perceptible force. As a result the projections 3 of the rods 2 engage the depressions 7 of the socket 5, and the projections 6 of the socket 5 (FIG. 2a) engage the depressions 4 of the rod 2, thus establishing a ridgeandrecess joint. The assembling procedure is completed when all the projections 3, 6 have engaged the respective depressions 4, 7. Part of the projections 6 and depressions 7 are left disengaged so as to simulate different interatomic distances (FIG. 2b).

Thus, when the model is assembled completely, the modules 1' and 1' (FIG.3) fit snugly against each other so that no rods 2 can be seen since they are accommodated inside the modules 1', 1'. On the other hand, in the case of an incomplete (intermediate) assembly the rods 2 protrude partially so that the modules 1", 1" are spaced out a distance apart, which is quite obvious from FIG. 3, wherein a fragment of a simulated macromolecule 8 is represented.

Figure 5A:
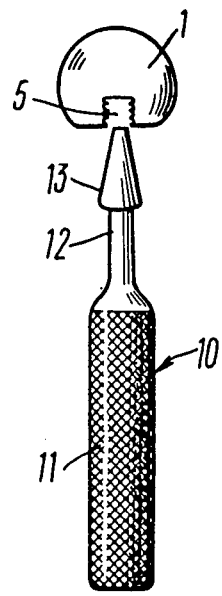
FIGS. 5a and 5b show the process of making a taper portion in the socket of a module, according to the invention.
Figure 4:
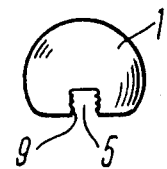
FIG. 4 is a module of a three-dimensional molecular model, according to the invention.

To facilitate interconnection of the modules 1 a portion 9 (FIG. 4) of the entrance to the sockets 5 is tapered, the taper shape being imparted to the socket 5 through the use of a special device. FIGS. 5a and b illustrate said device which has a handle 11, a shank 12 and a taper tip 13.

Figure 5B:
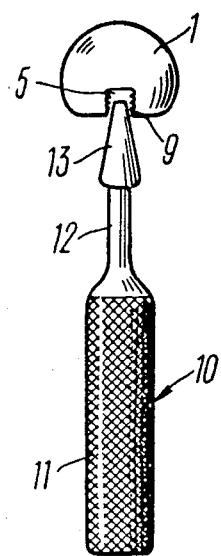

In order to expand the entrance to the socket 5, the tapered tip 13 (FIG. 5b) is introduced with some force into the socket 5. It is due to permanent set taken by the material of the module that the inlet portion of the socket 5 retains its taper shape.

Figure 6:
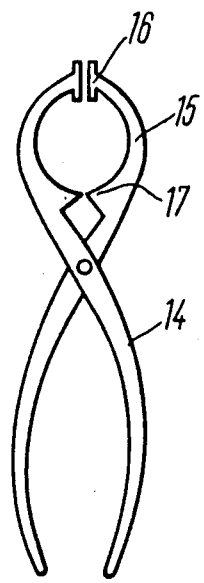
FIG. 6 is a device for disassembly and reassembly of a three-dimensional molecular model, according to the invention.
Figure 7A:
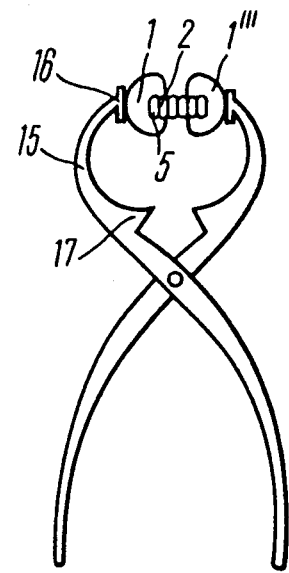
FIGS. 7a and b show the device of FIG. 6 while in operation.
Figure 7B:
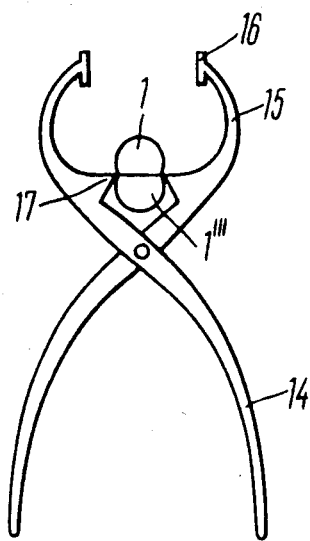

FIGS. 6 and 7 illustrate a device for assembly and disassembly of a three-dimensional molecular model.

The device has handles 14 which are hinged together, the ends of said handles carrying bent jaws 15 each having a wider portion 16.

The inner surface of the jaws 15 has wedge-like projections 17.

To join the modules 1' and 1''' together (FIG. 7a) one should take one module 1 with the rod 2 held in the socket 5, and another module 1''' having its socket 5 vacant. Then the rod 2 of the module 1''' and the modules 1, 1''' are put between the wider portions 16 of the jaws 15, whereupon the jaws are brought together. A characteristic click gives evidence that the modules 1, 1''' have become joined together completely.

To bring the modules 1, 1''' apart (FIG. 7b) they are so positioned that the wedge-like projections 17 should enter a gap between the modules 1, 1'''. When the handles 14 are brought together, the modules 1, 1" are disjoined due to the action of the projections 17 entering the afore-mentioned gap.

The herein-proposed construction of the connecting elements of the three-dimensional model of molecular structure provides for reliable interlinking of various modules in the model and makes it possible to establish the models of adequately large molecular structures featuring variable interatomic distances. In addition, it is due to the proposed device that the model can be assembled or disassembled quickly and without applying much effort.

INDUSTRIAL APPLICABILITY

The invention can find application both in research and educational practice to give three-dimensional representation of the molecular structure of various substances and of their transformations. The invention is also applicable for decoding and interpreting the initial data obtained from crystallographic studies of chemical compounds, as well as for disclosing their most probable structural states.

I claim:

1. A three-dimensional model of molecular structure, comprising plastic modules each of which representing one atom of the molecular structing being simulated and which are interlinked through connecting elements fitted in sockets of each module, said sockets being shaped so as to suit the shape of the connecting element, wherein the improvement comprises each connecting element including a cylindrical rod made of a compact plastic whose entire surface, as well as the mating surface of the sockets of each module, is provided with easily curved projections alternating with depressions of the same shape to establish a ridge-and-recess joint and adjoin the modules to each other when the connecting element is fitted in the socket.

2. A three-dimensional model as claimed in claim 1, wherein the projections and the depressions are so arranged on the cylindrical rod that their axis is parallel to the axis of the cylindrical rod.

3. A three-dimensional model as claimed in claim 1 or 2, wherein a portion at the entrance to each socket is tapered.

* * * * *